US007574429B1

(12) United States Patent
Zaifman

(10) Patent No.: US 7,574,429 B1
(45) Date of Patent: Aug. 11, 2009

(54) METHOD FOR INDEXED-FIELD BASED DIFFERENCE DETECTION AND CORRECTION

(75) Inventor: Arthur L. Zaifman, Millburn, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 66 days.

(21) Appl. No.: 11/474,559

(22) Filed: Jun. 26, 2006

(51) Int. Cl.
*G06F 7/00* (2006.01)
(52) U.S. Cl. .............................................. 707/3; 707/4
(58) Field of Classification Search ............... 707/1–10, 707/100–102
See application file for complete search history.

(56) References Cited

U.S. PATENT DOCUMENTS

| | | | |
|---|---|---|---|
| 5,404,502 A | 4/1995 | Warner et al. | |
| 5,870,762 A | 2/1999 | Lee | |
| 6,668,262 B1 | 12/2003 | Cook | |
| 2004/0064351 A1* | 4/2004 | Mikurak | 705/7 |
| 2004/0078730 A1 | 4/2004 | Ma et al. | |
| 2004/0153407 A1* | 8/2004 | Clubb et al. | 705/41 |
| 2005/0171937 A1* | 8/2005 | Hughes et al. | 707/3 |
| 2005/0234858 A1 | 10/2005 | Torii et al. | |
| 2005/0234918 A1 | 10/2005 | Brunnabend et al. | |
| 2006/0248558 A1* | 11/2006 | Barton et al. | 725/46 |

OTHER PUBLICATIONS

Microsoft Press Computer Dictionary, 5th edition, p. 133, copyright 2002.*

* cited by examiner

*Primary Examiner*—Wilson Lee

(57) ABSTRACT

A method and system for indexed field based difference detection and correction. A data feed file is partitioned into a plurality of subsets based on an indexed field of the data feed file. A redundancy check value is calculated for each of the subsets, and the redundancy check value is compared to a database file which corresponds to each subset. If the redundancy check values do not match for a subset and a corresponding database file, a difference is detected between the subset and the corresponding database file and the corresponding database file is replaced by the subset.

22 Claims, 4 Drawing Sheets

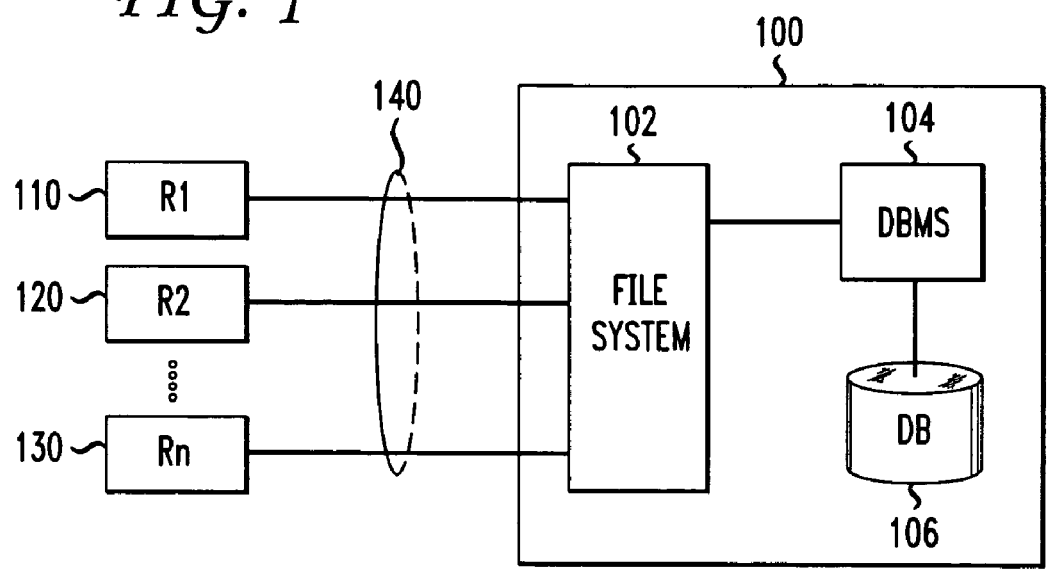
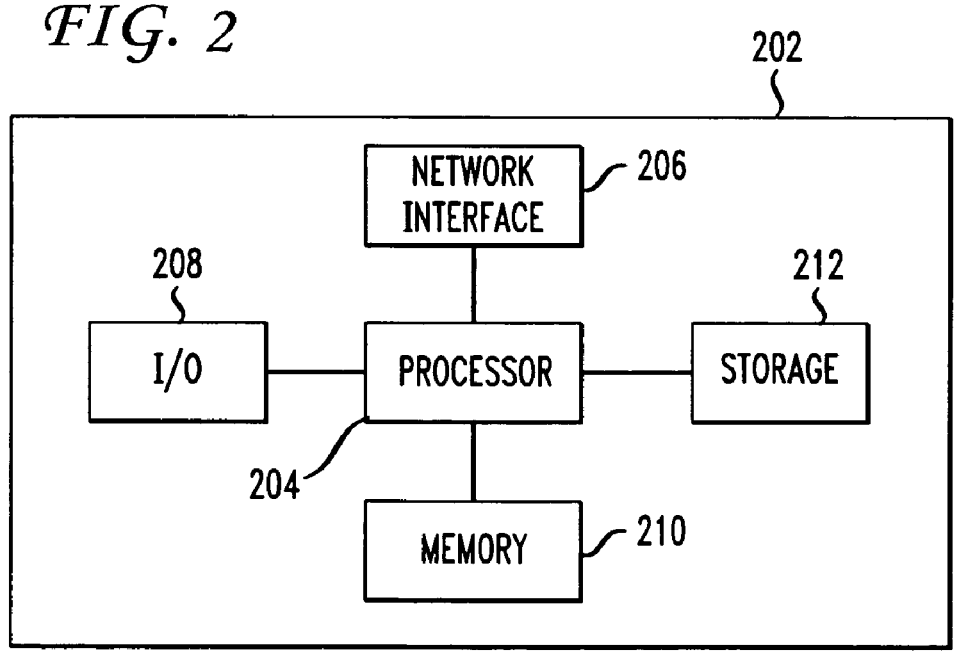

FIG. 5

| | SOURCE NAME | TIMESTAMP | FIELD NAME | FIELD VALUE | CRC |
|---|---|---|---|---|---|
| 502 | P9-US-ROUTER | 1148310000 | SRC ADDR | 32.95.217.193 | 1293496762 |
| 504 | P9-US-ROUTER | 1148310000 | SRC ADDR | 32.95.217.209 | 1364397632 |
| 506 | P9-US-ROUTER | 1148310000 | SRC ADDR | 207.37.101.2 | 1199367824 |

METHOD FOR INDEXED-FIELD BASED DIFFERENCE DETECTION AND CORRECTION

BACKGROUND OF THE INVENTION

The present invention is generally directed to database content correction. More specifically, the present invention is directed to detecting and correcting differences between a data feed file and a corresponding representation of the data feed file stored in a database.

Data feeds are records of data that are transmitted to a database machine to be stored in a database. A database machine is any computer device, such as a PC, a network server, etc. which has a database. For example, data feeds can contain detailed records of network conversations, which are explicit exchanges of data between two or more network endpoints. For example, data feed containing detailed Internet Protocol (IP) traffic records can be collected for IP traffic analysis. Data feeds can be transported to a database machine in the form of data streams. When data feeds are transported to a database machine, the data feeds are sampled and the sampled data feeds are stored as data feed files in a file system of the database machine. The data feed files are distinguished from one another by a filename which can include a source of the data feed and a source timestamp corresponding to a time at which the data feed was generated. The data feed files are then imported into a database and stored as a set of records. The information contained in a filename of a data feed file can be used to identify the set of records that represents the data feed file. As used herein, the term "database file" refers to a set of records in the database. For a particular data feed file, a corresponding database file is the set of records stored in the database that represents the contents of that data feed file.

When an original data feed received at a database machine is sampled and stored as a data feed file, enough information from the original data feed is also stored. If there is any problem with a database file, such as errors being detected therein, the stored information from the original data feed is re-sampled and stored in the file system as a new version of the data feed file. Furthermore, it may be necessary to re-sample the original data feed in order to preserve a greater level of detail when subtle problems arise. For example, if the original data feed is network traffic data, the network traffic data may be re-sampled to preserve greater detail at a certain stage of a denial of service attack. The new version of the data feed file has the same file name as the previous version of the data feed file, but may contain different data.

When a new version of a data feed file previously stored in a database is stored on the file system a database machine, the new version of the data feed file is assigned a file system timestamp corresponding to a time at which the new version of the data feed file is stored in the file system. The database machine periodically scans the file system for new files (i.e., files having a file system timestamp more recent than a previous scan). When a scan finds a new version of a file previously stored in the database, the entire previously stored database file is deleted, and the entire new data feed file is imported to be stored in the database, even if only a small fraction of the data feed file differs from the corresponding database file previously stored in the database.

Typically, data feed files (and the corresponding database files) are very large. Therefore, deleting and re-loading large files having mostly the same data is inefficient and can lead to database downtime. Accordingly, it is desirable to detect and correct differences between a data feed file and a corresponding stored database file while minimizing database downtime.

BRIEF SUMMARY OF THE INVENTION

The present invention provides a method and system capable of performing fine grain database content correction at indexed speeds in order to minimize database down time. This is accomplished by partitioning data feed files into subsets using indexed fields of the data feed files and storing data in a database in database files corresponding to the subsets. This reduces the scope of correction in a database, and thus database downtime, when errors in a data feed are detected after the data feed has already been stored in the database.

In one embodiment of the present invention, a data feed file is partitioned into a plurality of subsets based on an indexed field of the data feed file. A redundancy check value, such as a cyclic redundancy check (CRC), is calculated for each of the subsets, and the redundancy check value for each subset is compared to a corresponding database file stored in a database. If the redundancy check values of the subset and the corresponding database file are not equal, the corresponding database file is replaced in the database with the subset. If no corresponding database file is stored in the database for a subset, the subset is loaded into the database and stored as the corresponding database file. A database table can be used to quickly determine whether a corresponding database file is stored in the database for a subset and to quickly compare the redundancy check values for a subset and a corresponding database file.

In one embodiment of the present invention, a file system stores received data feeds as data feed files, and a database stores subsets of data feed files as corresponding database files. A database management system (DBMS) partitions the data feed files into the subsets based on indexed fields of the data feed files. The DBMS compares redundancy check values of the subsets and the corresponding database files and replaces database files with the corresponding subsets when the redundancy check values do not match. The DBMS can scan the file system periodically for data feed files that have been stored in the file system since a previous scan.

These and other advantages of the invention will be apparent to those of ordinary skill in the art by reference to the following detailed description and the accompanying drawings.

BRIEF DESCRIPTION OF THE DRAWINGS

FIG. 1 illustrates an exemplary system configured to implement an embodiment of the present invention;

FIG. 2 illustrates a high level block diagram of a computer capable of implementing the present invention;

FIG. 5 illustrates an exemplary Correct-Detect Table stored in a database according to an embodiment of the present invention.

DETAILED DESCRIPTION

Figure 3:
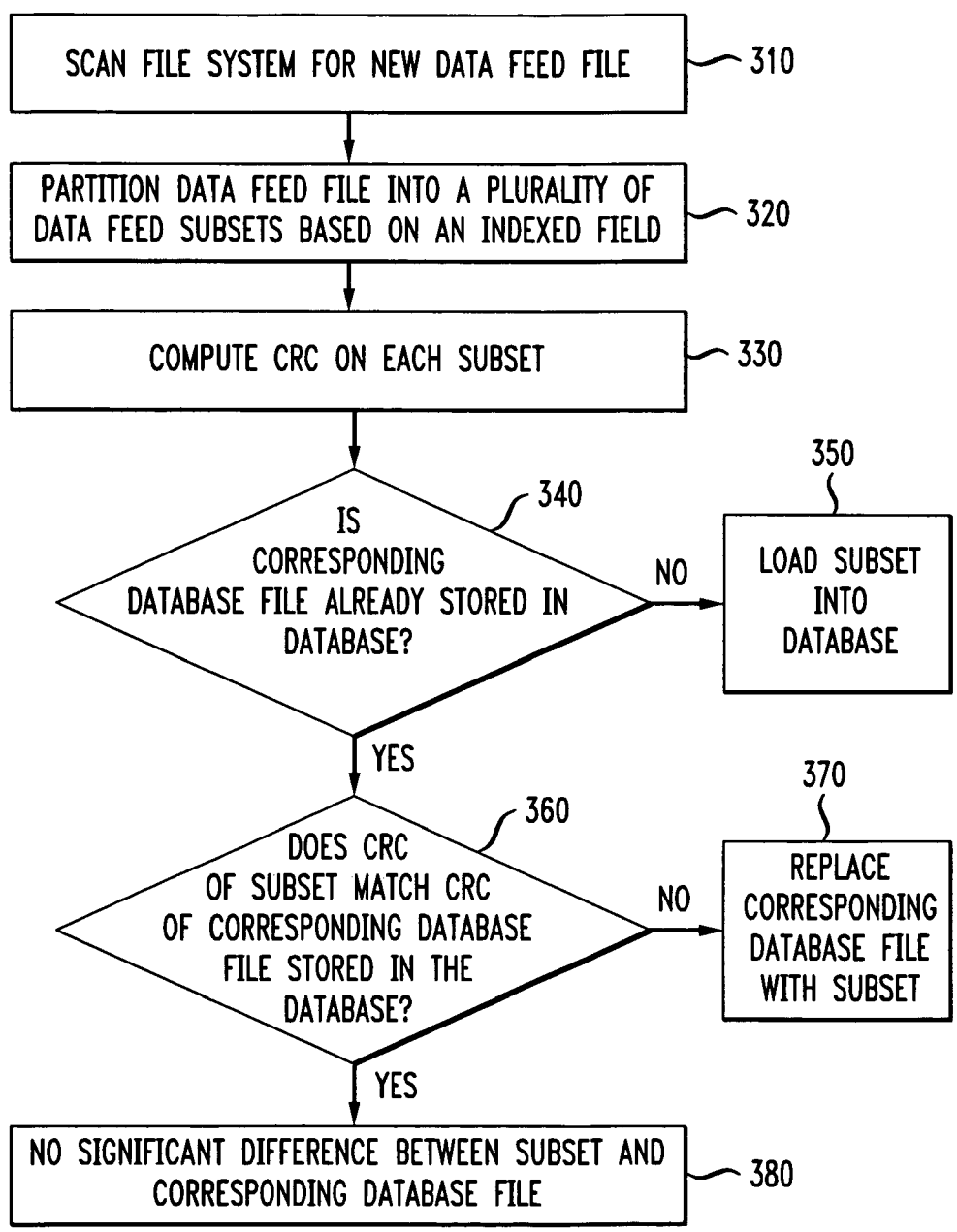
FIG. 3 illustrates a method of detecting and correcting differences between data feed files and corresponding stored database files according to an embodiment of the present invention.

FIG. 1 illustrates an exemplary system configured to implement an embodiment of the present invention. The elements of FIG. 1 are functional elements which can be implemented using computer hardware, software, etc. As illustrated in FIG. 1, a database machine 100 includes a file system 102, a database management system (DBMS) 104, and a database 106. Data feeds are received at the database machine 100, sampled, and organized into files which are stored in the file system 102. These files are referred to herein as "data feed files". Data feeds are streams of data that are sent to the database machine 102 from various sources. The data feeds are sampled and stored as data feed files which are distinguished by the source of the data feed and a source timestamp assigned by the source of the data feed based on the time at which the data is generated. The data feed files are also assigned a file system timestamp by the file system 102 based on the time at which the data feed files are stored in the file system 102.

The DBMS 104 loads data of the data feed files from the file system 102 to be stored in the database 106. Files that are stored in the database 106 are referred to herein as "database files". The DBMS 104 also is capable of deleting database files from the database 106.

In an embodiment of the present invention illustrated in FIG. 1, the database machine 100 can be connected to multiple network routers R1 110, R2 120, . . . , Rn 130. The network routers R1 110, R2 120, . . . , Rn 130 can be connected to the database machine 100 by high bandwidth data links 140. The network routers R1 110, R2 120, . . . , Rn 130 are sources which transmit data feeds to the database machine 100 via the high bandwidth data links 140. The data feeds can be detailed records of network traffic which are sent to the database machine 100 to be stored in the database 106 for network analysis. However, the present invention is not limited to records of network traffic, and may be implemented using any other type of data from any source.

The database machine 100 can be implemented as a computer using well known computer processors, memory units, storage devices, computer software, and other components. A high level block diagram of such a computer is illustrated in FIG. 2. Computer 202 contains a processor 204 which controls the overall operation of the computer 202 by executing computer program instructions which define such operation. The computer program instructions may be stored in a storage device 212 (e.g., magnetic disk) and loaded into memory 210 when execution of the computer program instructions is desired. Thus, the file system 102 and the DBMS 104 can be implemented as applications defined by the computer program instructions stored in the memory 210 and/or storage 212 and controlled by the processor 204 executing the computer program instructions. The computer 202 also includes one or more network interfaces 206 for communicating with other devices via a network. The computer 202 also includes input/output 208 which represents devices which allow for user interaction with the computer 202 (e.g., display, keyboard, mouse, speakers, buttons, etc.) One skilled in the art will recognize that an implementation of an actual computer will contain other components as well, and that FIG. 2 is a high level representation of some of the components of such a computer for illustrative purposes.

FIG. 3 illustrates a method of detecting and correcting differences between data feed files and corresponding stored database files. This method will be described while referring to FIGS. 1 and 3.

At step 310, the DBMS 104 scans the file system 102 for new data-feed files. As described above, each data feed file is assigned a file system timestamp when it is stored in the file system 102. The DBMS 104 periodically scans the file system 102 for any data feed files having a timestamp that is after a time of the previous scan. Any data feed file having a file system timestamp that is after the time of the previous scan is considered new. It is possible that the DBMS 104 will create a temporary file including filenames of each new data feed file.

Figure 4:
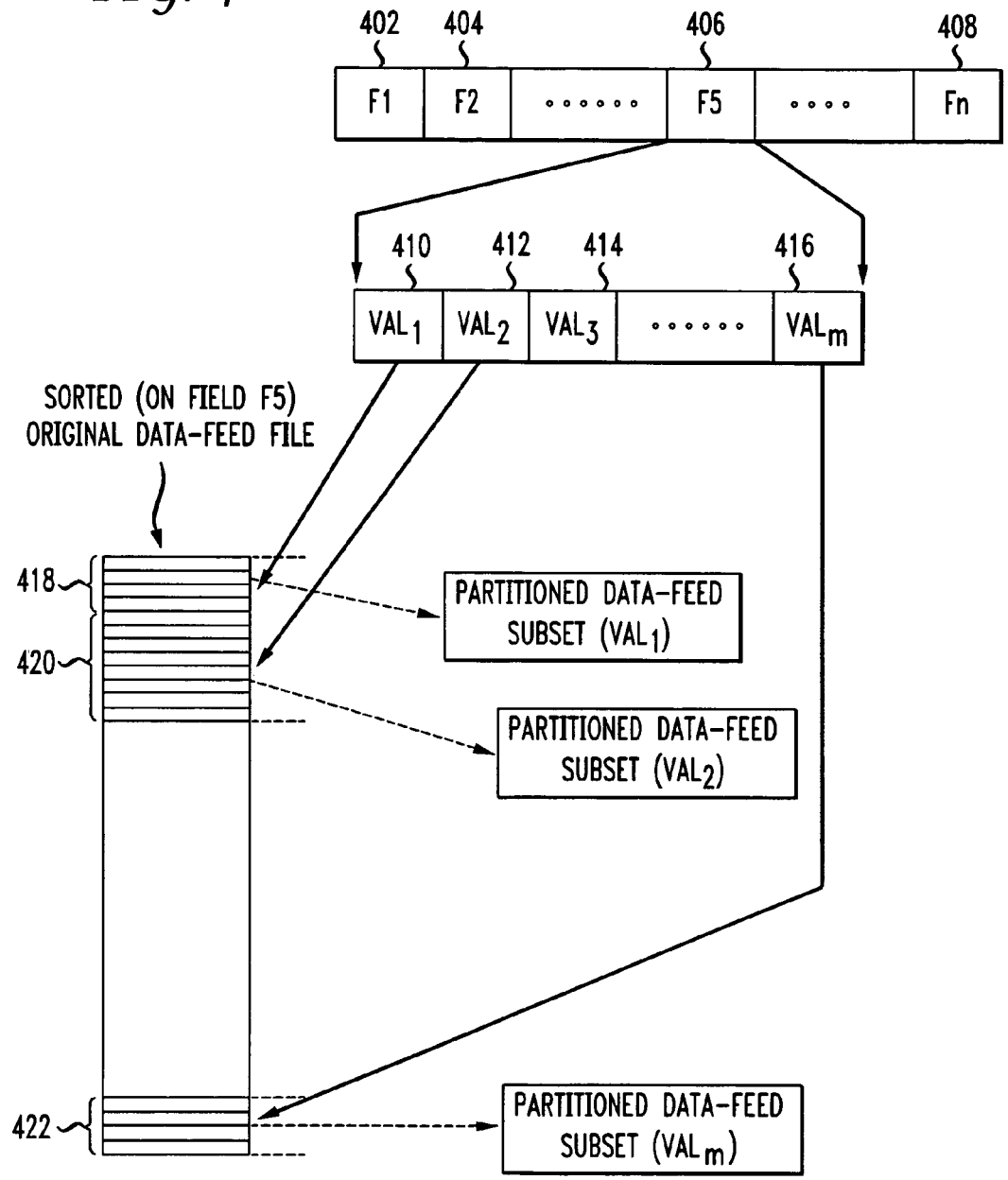
FIG. 4 illustrates records of a data feed file being partitioned based on an indexed field according to an embodiment of the present invention.

At step 320, a new data feed file is partitioned into a plurality of data feed subsets based on an indexed field of the data feed file. An index is a feature in a database that allows quick access to rows in a database table, and is optimized for quick searching. An index can be created on a field in a database, and only stores the value of that field. Accordingly, an indexed field can be used to quickly search a database based on the value of the indexed field. A data feed file is made up of a plurality of records, each having multiple fields. The fields can correspond to information contained in each record, such as source IP address, destination IP address, source and destination port numbers, class of service, number of hops, timestamp corresponding to a network call, etc. FIG. 4 illustrates the records of a data feed file being partitioned based on an indexed field. As illustrated in FIG. 4, each record of a data feed file includes n fields F1 402, F2 404, . . . , F5 406, . . . , Fn 408. The records of this data feed file are partitioned based on F5 406, which is an indexed field. For all of the records of the data feed file, m unique values $val_1$ 410, $val_2$ 412, $val_3$ 414, . . . , $val_m$ of field F5 406 occur. Accordingly, m data feed subsets are created corresponding to the m values 410-416 of field F5 406. As illustrated in FIG. 4, a first data feed subset 418 includes records of the data feed file having the value $val_1$ 410 for field F5 406, a second data feed subset 420 includes records having the value $val_2$ 412 for field F5 406, . . . and an $m^{th}$ data feed subset 422 includes records having the value $val_m$ 416 for field F5 406. The data feed subsets are assigned separate filenames. The filename format of each data feed subset can be: Source name:Timestamp:Field name:Field value. Source name is the source of the original data feed file, Timestamp is the source timestamp which is assigned to the original data feed file according to a time which the data was generated (Source name and Timestamp can be the original filename of the data feed file), Field name is the name of the indexed field used to partition the data feed file (F5 406 in FIG. 4), and Field value is the value ($val_1$ 410, $val_2$ 412, $val_3$ 414, . . . , $val_m$ 416 in FIG. 4) of the indexed field used to partition the data feed file. These four values can be collectively referred to as the "filename" of a subset.

Returning to FIG. 3, at step 330, a redundancy check value is calculated for each of the data feed subsets. A redundancy check value refers to any value calculated for a block of data which can be used to check for errors in the block of data. For example, a cyclic redundancy check (CRC) can be performed to determine the redundancy check value. As described herein, a CRC is used for the redundancy check value, but the present invention is not limited thereto and can be implemented using any other form of redundancy check value. The CRC calculated for each subset can be appended to the filename of the corresponding subset. Accordingly, the filename format of each subset can be: Source name:Timestamp:Field name:Field value:CRC.

At step 340, for each data feed subset, it is determined whether a corresponding database file is already stored in the database 106. In an embodiment of the present invention, a Correct-Detect Table, which is stored in the database 106, can be used to determine whether a corresponding database file is stored in the database 106 for a data feed subset. FIG. 5 illustrates an exemplary Correct-Detect Table 500. The Correct-Detect Table includes a plurality of records 502-506 corresponding to database files stored in the database 106, and each record has a plurality of fields 508-516. As illustrated in FIG. 5, the Correct-Detect Table includes a first record 502, a second record 504, and third record 506. Each record 502-506 has the fields of Source name 508, Timestamp 510, Field name 512, Field value 514, and CRC 516. The Source name field 508 corresponds to a name of a router (i.e., R1-Rn 110-130 of FIG. 1) or other source of the data feed file from which the data feed subset is partitioned. The Timestamp field 510 corresponds to the source timestamp associated with the data feed file from which the data feed subset is partitioned. The source timestamp represents a time at which the data was generated or gathered. For example, in the case of network traffic the source timestamp represents a time window in which the network traffic occurred. The Field name field 512 corresponds to a name of the indexed field used to partition the data feed file, and the Field Value field 514 corresponds to the value of the field used to partition the data feed file. The Source name field 508, the Timestamp field 510, and the Field name field 512, and the Field value field 514 of a record, can be collectively referred to as the "filename" of the database file corresponding to that record. The CRC field 516 corresponds to a CRC calculated for the database file corresponding to the particular record of the Correct-Detect Table.

As illustrated in FIG. 5, the first second and third records 502, 504, and 504 have the same values for the Source name field 506 (P9-US-router), the Timestamp field 508 (1148310000) and the Field Name field 510 (SrcAddr), but different values for the Field Value field 512 (32.95.217.193, 32.95.217.209, and 207.37.101.1, respectively). This means that both record1, record 2, and record 3 are database files that correspond to subsets of a data feed file received at the database machine 100 from the router P9-US-router at the time 148310000, and partitioned based on the source address of the records of the data feed file. Thus, record1 502 represents the database file corresponding to the data feed subset of records having the source address of 32.95.217.193, record 2 504 represents the database file corresponding to the data feed subset of records having the source address of 32.95.217.209, and record3 506 represents the database file corresponding to the data feed subset of records having the source address of 207.37.101.1.

In order to determine whether a corresponding database file is stored in the database for a data feed subset, it is determined whether a record of the Correct-Detect Table 500 has the same filename as the data feed subset. That is, it is determined whether a record has the same Source name, Timestamp, Field name, and Field value as the data feed subset. If it is determined that a corresponding database file is not already stored in the database 106 for a data feed subset at step 340, the method proceeds to step 350. If it is determined that a corresponding database file is already stored in the database for a data feed subset at step 340, the method proceeds to step 360.

At step 350, the DBMS 104 loads the data feed subset into the database 106 to be stored as a corresponding database file. The DBMS also adds a record to the Correct-Detect Table 500 representing the database file corresponding to the data feed subset.

At step 360, it is determined whether the CRC of the data feed subset matches a CRC of the corresponding database file stored in the database 106. In order to determine whether the CRCs of data feed subset and the corresponding database file match, the DBMS 104 compares the CRC appended to the filename of the data feed subset with the CRC field 516 of the record in the Correct-Detect Table 500 representing the corresponding database file. If the CRCs do not match for a data feed subset and the corresponding database file, the method proceeds to step 370. If the CRCs do match for a data feed subset and the corresponding data base file, the method proceeds to step 380.

At step 370, the DBMS 104 replaces the corresponding database file with the data feed subset. That is, the DBMS 104 deletes the database file corresponding to the data feed subset, and loads the data feed subset to the database 106 to be stored as a corresponding database file. The DBMS can delete the corresponding database file at indexed speeds by generate a query to extract the source timestamp, field name, and field value, from the record in the Correct-Detect Table 500 representing the database file to be deleted. These values full define the range of data in the database 106 that needs to be deleted. Accordingly, the DBMS 104 can delete the corresponding database file using the values for the source timestamp, field name, and field value extracted from the Correct-Detect-Table. The DBMS 104 also replaces the record in the Correct-Detect Table 500 representing the corresponding database file.

At step 380, the DBMS determines that there is no significant difference between the data feed subset and the corresponding database file and leaves the corresponding database file unchanged.

In addition to determining whether data feed subsets have previously been stored as corresponding database files in the database 106, it is also possible that the DBMS 104 determines whether a data feed file has been previously stored in the database 106 using the Correct-Detect Table 500. This can be performed by checking whether records exist in the Correct-Detect table having the source name and the source timestamp of the data feed file. If a database file (represented by a record in the Correct-Detect Table 500) having the same source name and source timestamp as a new data feed file is already stored in the database 106, but no data feed subset partitioned from the data feed file corresponds to that database file, it is possible that the DBMS 104 deletes that database file and the record in the Correct-Detect Table 500 representing that database file.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
   partitioning a data feed file into a plurality of subsets based on an indexed field of the data feed file;
   calculating a redundancy check value for each of the plurality of subsets;
   comparing the redundancy check value of each of the plurality of subsets with a redundancy check value of a corresponding stored database file; and
   if the redundancy check value for a subset is not equal to the redundancy check value of the corresponding stored database file, replacing the corresponding stored database file with said subset,
   wherein said partitioning step comprises storing a filename for each of the plurality of subsets, said filename comprising a source name of said data feed file, a source timestamp of said data feed file, a field name of said indexed field, and a field value of said indexed field, said method further comprising:
   storing the redundancy check value of each of the plurality of subsets and associating the redundancy check value with the filename for each of the plurality of subsets.

2. The method of claim 1, wherein said partitioning step comprises:
   grouping records of said data feed file into a subset for each unique value of said indexed field.

3. The method of claim 1, wherein said replacing step comprises:
   deleting said corresponding stored database file from a database; and
   loading said one of the plurality of subsets to the database to be stored as said corresponding stored database file.

4. The method of claim 1, wherein said calculating step comprises:
calculating a cyclic redundancy check (CRC) value as the redundancy check value for each of the plurality of subsets.

5. The method of claim 1, wherein said data feed file comprises records containing network traffic data.

6. The method of claim 5, further comprising:
receiving said data feed file from a network router.

7. A method comprising:
partitioning a data feed file into a plurality of subsets based on an indexed field of the data feed file;
calculating a redundancy check value for each of the plurality of subsets;
comparing the redundancy check value of each of the plurality of subsets with a redundancy check value of a corresponding stored database file; and
if the redundancy check value for a subset is not equal to the redundancy check value of the corresponding stored database file, replacing the corresponding stored database file with said subset,
wherein said partitioning step comprises:
storing a filename for each of the plurality of subsets, said filename comprising a source name of said data feed file, a source timestamp of said data feed file, a field name of said indexed field, and a field value of said indexed field; and
wherein said comparing step comprises:
searching a database table for a record representing the corresponding stored database file for each of the plurality of subsets based on the filename of each of the plurality of subsets; and
comparing the redundancy check value appended to the filename of each of the plurality of subsets with a redundancy check value stored in a redundancy check field of the record representing the corresponding stored database file for each of the plurality of subsets.

8. The method of claim 7, wherein a record representing a stored database file includes a source name field, a source timestamp field, a field name field, a field value field, and a redundancy check field.

9. The method of claim 8, wherein said replacing step comprises:
generating a query to extract the source timestamp, the field name, and the field value of said corresponding stored database file from the source timestamp field, the field name field, and the redundancy check field of the record representing said corresponding stored database file in said database table;
deleting said corresponding stored database file using the extracted source timestamp, field name, and field value; and
loading said subset to be stored as said corresponding stored database file.

10. The method of claim 7, further comprising:
when a corresponding stored database file is replaced by one of the plurality of subsets, updating the record representing the corresponding stored database file in said database table.

11. A method comprising:
partitioning a data feed file into a plurality of subsets based on an indexed field of the data feed file;
calculating a redundancy check value for each of the plurality of subsets;
determining whether a corresponding database file has been previously stored in a database for each of the plurality of subsets;
if a corresponding database file has not been previously stored in the database for one of the plurality of subsets, loading said one of the plurality of subsets to the database to be stored as said corresponding database file;
comparing the redundancy check value of each of the plurality of subsets with a redundancy check value of the corresponding stored database file; and
if the redundancy check value for a subset is not equal to the redundancy check value of the corresponding stored database file, replacing the corresponding stored database file with said subset.

12. The method of claim 7, wherein said partitioning step comprises:
grouping records of said data feed file into a subset for each unique value of said indexed field.

13. The method of claim 7, wherein said replacing step comprises:
deleting said corresponding stored database file from a database; and
loading said one of the plurality of subsets to the database to be stored as said corresponding stored database file.

14. The method of claim 7, wherein said calculating step comprises:
calculating a cyclic redundancy check (CRC) value as the redundancy check value for each of the plurality of subsets.

15. The method of claim 7, wherein said data feed file comprises records containing network traffic data.

16. The method of claim 15, further comprising:
receiving said data feed file from a network router.

17. The method of claim 11, wherein said replacing step comprises:
deleting said corresponding stored database file from a database; and
loading said one of the plurality of subsets to the database to be stored as said corresponding stored database file.

18. The method of claim 17, wherein said partitioning step comprises:
grouping records of said data feed file into a subset for each unique value of said indexed field.

19. The method of claim 17, wherein said partitioning step comprises:
storing a filename for each of the plurality of subsets, said filename comprising a source name of said data feed file, a source timestamp of said data feed file, a field name of said indexed field, and a field value of said indexed field.

20. The method of claim 7, wherein said calculating step comprises:
calculating a cyclic redundancy check (CRC) value as the redundancy check value for each of the plurality of subsets.

21. The method of claim 17, wherein said data feed file comprises records containing network traffic data.

22. The method of claim 21, further comprising:
receiving said data feed file from a network router.

* * * * *